US009130433B2

(12) United States Patent
Pietromonaco

(10) Patent No.: US 9,130,433 B2
(45) Date of Patent: Sep. 8, 2015

(54) ELECTRONICALLY CONTROLLED UNIVERSAL MOTOR

(71) Applicant: ARM Limited, Cambridge (GB)

(72) Inventor: David Pietromonaco, San Jose, CA (US)

(73) Assignee: ARM Limited, Cambridge (GB)

( * ) Notice: Subject to any disclaimer, the term of this patent is extended or adjusted under 35 U.S.C. 154(b) by 69 days.

(21) Appl. No.: 14/080,131

(22) Filed: Nov. 14, 2013

(65) Prior Publication Data

US 2015/0130390 A1    May 14, 2015

(51) Int. Cl.
*H02P 1/46* (2006.01)
*H02K 11/00* (2006.01)
*H02P 25/02* (2006.01)

(52) U.S. Cl.
CPC .......... *H02K 11/0005* (2013.01); *H02P 25/022* (2013.01)

(58) Field of Classification Search
USPC .......... 318/400.01, 400.14, 400.41, 700, 701, 318/727, 734, 770, 778, 799; 310/49.32, 310/49.46, 156.01, 154.44, 216.108
See application file for complete search history.

(56) References Cited

U.S. PATENT DOCUMENTS

| 5,525,851 | A | 6/1996 | Kumamoto |
| 5,744,895 | A | 4/1998 | Seguchi |
| 5,917,248 | A | 6/1999 | Seguchi et al. |
| 5,990,593 | A | 11/1999 | Narita et al. |
| 6,664,672 | B2 * | 12/2003 | Kalsi et al. ............ 310/57 |
| 7,667,366 | B2 * | 2/2010 | Zhang et al. ........... 310/216.135 |
| 8,450,954 | B2 | 5/2013 | Pietromonaco |
| 8,922,086 | B2 * | 12/2014 | Reutlinger .............. 310/181 |
| 2002/0047418 | A1 | 4/2002 | Seguchi et al. |

(Continued)

FOREIGN PATENT DOCUMENTS

| BE | 477 451 | 12/1947 |
| CN | 201953572 | 8/2011 |

(Continued)

OTHER PUBLICATIONS

Thomas, A.J., "A Doubly-Fed Permanent Magnet Generator for Wind Turbines", MIT Paper, (Jun. 2004), 78 pages.

(Continued)

*Primary Examiner* — Antony M Paul
(74) *Attorney, Agent, or Firm* — Nixon & Vanderhye P.C.

(57) ABSTRACT

An electric motor apparatus comprising: a stator component and a rotor component rotationally mounted coaxially with and within the stator component. The stator component and the rotor component each comprise windings configured to generate an electromagnetic field from an electric current. The electric motor further comprises an intermediate screening component rotationally mounted between the stator component and the rotor component and configured to provide at least some magnetic screening between the rotor component and the stator component. The intermediate screening component comprises at least some magnetically active sections configured such that changing magnetic fields generated by changing electric currents in the windings on either the rotor component or the stator component generate a force on the magnetically active sections causing the intermediate screening component to rotate; and control circuitry for independently controlling power supplied to the windings on the rotor component and the stator component in dependence upon a desired output rotational speed.

16 Claims, 6 Drawing Sheets

(56) References Cited

U.S. PATENT DOCUMENTS

| | | |
|---|---|---|
| 2003/0155832 A1 | 8/2003 | Herren |
| 2004/0239199 A1 | 12/2004 | Qu et al. |
| 2005/0077802 A1 | 4/2005 | Toujima |
| 2008/0136189 A1 | 6/2008 | Qu et al. |
| 2010/0139999 A1 | 6/2010 | Park |
| 2012/0025747 A1 | 2/2012 | Foster |
| 2012/0126650 A1 | 5/2012 | Kubes et al. |
| 2013/0069566 A1 | 3/2013 | Pietromonaco |

FOREIGN PATENT DOCUMENTS

| | | |
|---|---|---|
| CN | 101924437 | 10/2011 |
| CN | 102522866 | 6/2012 |
| EP | 0267845 | 5/1991 |
| EP | 1 456 048 | 9/2004 |
| FR | 2606225 | 5/1988 |

OTHER PUBLICATIONS

Qu, R., Dual-Rotor, Radial-Flux, Toroidally Wound, Permanent-Magnet Machines, (Nov.-Dec. 2003), 9 pages.

International Search Report and Written Opinion of the International Searching Authority issued Jun. 29, 2015 in PCT/GB2014/053178, 12 pages.

* cited by examiner

ELECTRONICALLY CONTROLLED UNIVERSAL MOTOR

FIELD OF THE INVENTION

The technical field relates to electric motors and in particular to motors in which both the rotor component and the stator component have winding arrangements.

BACKGROUND OF THE INVENTION

There are several different ways of configuring electric motors each of which has its own associated advantages and disadvantages. Many of these configurations provide very efficient operations. However, this high efficiency is generally restricted to a particular optimum operating frequency of the motor and when the motor moves away from this operating frequency the efficiency may drop dramatically. In order to address this problem, motors of the prior art have been operated in conjunction with gearing systems, such that they can drive axles at different speeds, while still operating close to their own optimum rotation frequency. The provision of gears adds cost to the system and can themselves reduce efficiency.

One known type of motor is the universal motor which is schematically shown in FIG. 1 and has a rotor component and stator component that both have winding arrangements. Such a universal motor can be operated with either DC or AC power and generally provides a compact and high powered motor. To some extent, a universal motor can be viewed as combining the advantages of both induction motors and permanent magnet motors. However, the difficulties associated with coupling the required waveforms to the rotor winding arrangements have significant drawbacks. This problem is addressed in U.S. Pat. No. 8,450,954.

Although such a universal motor may provide a compact and high powered motor, the efficiency of such a motor still reduces dramatically away from an optimum operating frequency and thus, such a motor is generally operated in conjunction with some gearing mechanism.

SUMMARY OF THE INVENTION

A first aspect provides an electric motor apparatus comprising:

a stator component and a rotor component rotationally mounted coaxially with and within said stator component;

said stator component and said rotor component each comprising windings for generating an electromagnetic field;

said electric motor further comprising an intermediate screening component rotationally mounted between said stator component and said rotor component and configured to provide at least some magnetic screening between said rotor component and said stator component;

said intermediate screening component comprising at least some magnetically active sections configured such that changing magnetic fields generated by changing electric currents in said windings on either said rotor component or said stator component generate a force on said magnetically active sections causing said intermediate screening component to rotate; and.

control circuitry for independently controlling power supplied to said windings on said rotor component and said stator component in dependence upon a desired output rotational speed.

The present invention recognises that motors where both the rotor and stator have windings which are independently powered are known and provide a compact motor which provides a high torque. However, it also recognises that there are problems associated with running such motors efficiently at different rotational speeds. It addresses this problem by placing a rotatable intermediate screening component between the rotor and stator of such a motor where both the rotor and stator have driven windings, such that the magnetic field generated from the rotor and stator which previously interacted to provide the force that drove the rotor are decoupled from each other via the intermediate screening layer. This allows the rotor and stator to in effect act as independent motors, the rotor speed depending on the power and direction of these two "motors". Thus, rather than having a single optimum power loading which provides a particular rotational speed, with other speeds having much lower efficiencies, the motor can run relatively efficiently at a plurality of different speeds. These speeds include the speed generated when the rotor is powered alone at or close to its optimum efficiency, the speed when just the stator is powered at or close to its optimum efficiency and other speeds when the rotor and stator are powered together either to generate rotation in the same direction nor in opposite direction at their high efficiency levels, such that the resulting rotational speed of the rotor is a sum of the rotational speeds generated by each of the rotor and stator components.

By amending the motor in this way and extending the range of speeds at which it operates efficiently the need for a gearing system is reduced or in some cases eliminated, which decreases the cost and improves the efficiency of the system. Indeed, where a variable gear set is avoided, the need for a corresponding transmission is also avoided. Complex techniques in which for example the gear variability is provided by a planetary gear set connected to a second motor are thus avoided, and such a second motor is not required.

Although, in some embodiments said stator component and said rotor component may comprise a different number of windings, in others they comprise the same number of windings. As the stator is larger than the rotor then it can accommodate more windings and thus, in some embodiments it may be efficient to arrange more windings on the stator. In others, however, it may be advantageous if the rotor and stator have the same number of windings as this makes the design more symmetrical and thus, in some cases easier to design and to manufacture.

In some embodiments, said intermediate screening component comprises a plurality of inserts on at least one of said inner and outer surfaces of a highly electrically conductive material, said plurality of inserts running at an offset angle to said longitudinal axis to form a squirrel cage, said plurality of inserts on a same surface being coupled at either end to form loops.

In some embodiments the screening component comprises a squirrel cage of highly conductive material such that the current is induced in the loops of the highly conductive material which then generate a magnetic field themselves. In this way, an inductive motor is produced.

In some embodiments, the plurality of inserts is arranged on both the inner and outer surfaces.

Although, the inserts may be on only one of the surfaces of the intermediate screening component, in many embodiments they will be on both surfaces with an inductive motor being produced between the outer surface of the intermediate screening component and the stator and the inner surface of the intermediate layer and the rotor.

In some embodiments, said plurality of inserts on said inner surface are arranged at different circumferential positions to said plurality of inserts on said outer surface.

It may be advantageous if the inserts are arranged at different circumferential positions on the inner and outer surfaces. This allows the intermediate screening component to be made thinner which can result in a more compact motor.

The arrangement of the windings on the rotor and the stator are designed to be appropriate for interaction with the arrangement of the inserts. Thus, in some embodiments there may be a same number of windings on the rotor and the stator and the same number of inserts on the inner and outer surfaces. In such a case these inserts are preferentially arranged at different circumferential positions such that inserts on the outer surface for example slot within the gaps between the inserts on the inner surface.

In other embodiments, said intermediate screening component comprises said plurality of protrusions on both said inner and outer surfaces.

Rather than having induction motors, the intermediate screen may have protrusions and be formed of some magnetically active material and the motor reactors are switched reluctance motors.

In some cases, said inner and said outer surface comprise a same number of said plurality of protrusions, said plurality of protrusions on said inner surface being offset compared to said plurality of protrusions on said outer surface, such that a protrusion on said inner surface is not formed at a same circumferential position as a protrusion on said outer surface.

Having the protrusions offset with respect to each other allows for a thinner and yet robust intermediate screening surface that makes efficient use of the material required to manufacture it.

In some embodiments said protrusions are formed by said inner and outer surfaces being undulating surfaces, said undulating surfaces undulating at a substantially same rate and same direction such that such that a thickness of said intermediate screening component is substantially constant around the circumference.

allows an indent on the outer surface to become a protrusion on the inner surface which reduces the amount of material required to form the intermediate screening component and also reduces its thickness allowing for a more compact motor.

Having the same number of protrusions on the inner and outer surfaces allows an indent on the outer surface to become a protrusion on the inner surface which reduces the amount of material required to form the intermediate screening component and also reduces its thickness allowing for a more compact motor. For example, where the number of windings on the rotor and stator are the same then the intermediate screen can be configured to have the same number of protrusions on the inner and outer surface.

In some embodiments, said rotor component and said intermediate screening component are mounted on a same axle.

Although the intermediate screening component may be mounted on bearings on the rotor itself, it may be advantageous to mount it on the same axle as the rotor. An axle is generally machined to a high degree of accuracy and mounting the rotor and the intermediate screen on the same component reduces the potential for error tolerances and makes the design and manufacture of the motor simpler and more to accurate.

In some embodiments, said control circuitry comprises a stator component control unit and a rotor component control unit, said rotor component control unit being mounted on said rotor component.

In order for the electric motor to function efficiently with the intermediate screening component, then the rotor needs to be separately controlled to the stator. Thus, in embodiments of the present invention the rotor component has a control unit mounted on the rotor component which allows separate control of the windings on the rotor component to those on the stator component. This allows the motor to be controlled efficiently as the stator and rotor can be controlled independently of each other allowing each to operate at or close to its most efficient power loading and in either of the two rotation directions. In this way a number of different output speeds can be generated from the motor at high efficiency without the need for gearing mechanisms. Furthermore, by mounting the rotor control unit on the rotor it can be independently controlled without the need to transmit control signals to the rotor itself, reducing the need for the commutators or numerous slip rings, since only the externally supplied rotor supply voltage needs to be coupled to the rotor component and. This means that the noise and inefficiency associated with a commutator and the manufacturing complexity associated with numerous slip rings are each avoided or at least reduced.

In some embodiments, said stator control unit is configured to control power supplied to said windings on said stator component to thereby generate a rotational force on said intermediate screening component; and said rotor control unit is configured to control power supplied to said windings on said rotor component to thereby generate a rotational force between said intermediate screening component and said rotor component, said rotational force exerted on said rotor component being dependent on a rotational speed of said intermediate screening component due to said rotational force generated by said stator component and said rotational force generated between said intermediate screening component and said rotor component by power supplied to said windings of said rotor component.

As noted above, independent control of the power supplied to the windings on the stator and rotor provides a wide range of control possibilities for the motor. In particular the rotational force provided to the intermediate screening component can be varied in a number of different ways while still providing the windings on the respective rotor and/or stator with or close to their most efficient power loading.

In some embodiments, said rotational forces generated by said stator control unit and said rotor control unit are combined via said intermediate screening component to generate a cumulative rotational force on said rotor component.

As noted previously, the cumulative rotational force on the rotor is provided by the force generated from the windings of the rotor component and the intermediate screening component and the force generated by the stator windings transmitted to the rotor via intermediate screening component, a cumulative rotational force being generated via the screening component which is transmitted to the rotor component. Thus, by independently controlling the stator and the rotor windings the cumulative force exerted on the rotor component can be controlled across a wide range of values.

In some embodiments, the electric motor further comprises a rotational position sensor configured to generate rotational position information indicative of a relative orientation of said intermediate screening component and said rotor component and said intermediate screening component and said stator component, said rotor control unit mounted on said rotor component being coupled to a power supply supplied to said rotor component and configured to generate a rotor component power supply waveform from said power supply in dependence upon said rotational position information and a desired output frequency of rotation of said rotor component relative to said intermediate screening component and to apply said rotor component power supply waveform to said rotor component; and said stator control unit being coupled to a power supply supplied to said stator component and configured to generate a stator component power supply waveform from said power supply in dependence upon said rotational position information of said intermediate screening component and said stator component and a desired output speed of rotation and to apply said stator component power supply waveform to said stator component.

In order to provide effective independent control of the rotor and the stator, particularly for switched reluctance motors, a rotational position sensor configured to generate rotational position information indicative of a relative orientation of the intermediate screening component and the rotor component and the intermediate screening component and the stator component is required such that the windings are powered in an appropriate fashion to drive them with the appropriate currents to produce the required force on the intermediate screening component. Where the intermediate screening component is formed of squirrel cages of high conductive inserts then the rotational position sensor is less important as such inductive motors tend to be self aligning. However, it may be required in some embodiments where the stator and rotor are interacting to ensure they do so in a correct manner.

A second aspect of the present invention provides a method of operating an electric motor apparatus, said electric motor apparatus comprising: a stator component and a rotor component rotationally mounted coaxially with and within said stator component; said stator component and said rotor component each comprising windings for generating an electromagnetic field; said electric motor further comprising an intermediate screening component rotationally mounted between said stator component and said rotor component and configured to provide at least some magnetic screening between said rotor component and said stator component; said intermediate screening component comprising at least some magnetically active sections configured such that changing magnetic fields generated by changing electric currents in said windings on either said rotor component or said stator component generate a force on said magnetically active sections causing said intermediate screening component to rotate; said method comprising controlling an output rotational speed of said motor by providing power to either said rotor or said stator or said rotor and said stator, control circuitry for independently controlling power supplied to said windings on said rotor component and said stator component in dependence upon a desired output rotational speed.

A third aspect of the present invention provides an electric motor apparatus comprising:

a stator component and a rotor component rotationally mounted coaxially with and within said stator component;

said stator component and said rotor component each comprising windings means for generating an electromagnetic field;

said electric motor further comprising an intermediate screening means for providing at least some magnetic screening between said rotor component and said stator component, said intermediate screening means being rotationally mounted between said stator component and said rotor component;

said intermediate screening means comprising at least some magnetically active means for responding to changing magnetic fields generated by changing electric currents in said windings on either said rotor component or said stator component by generating a force such that said intermediate screening component is caused to rotate; and control means for independently controlling power supplied to said winding means on said rotor component and said stator component in dependence upon a desired output rotational speed.

The above, and other objects, features and advantages of this invention will be apparent from the following detailed description of illustrative embodiments which is to be read in connection with the accompanying drawings.

DESCRIPTION OF EMBODIMENTS

Figure 1A:
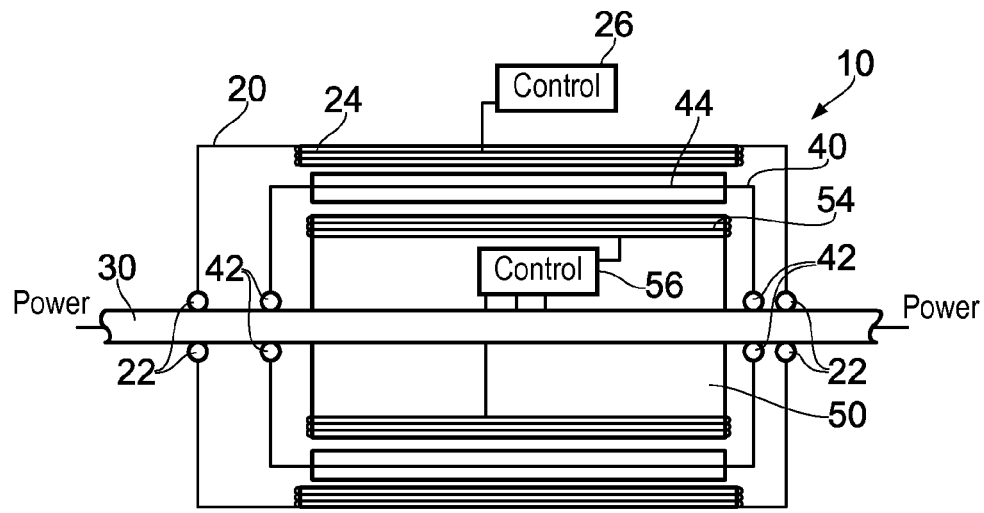
FIG. 1a shows a cross section through motor 10 according to an embodiment of the present invention.

FIG. 1a shows a cross section through motor 10 according to an embodiment of the present invention. Motor 10 comprises a stator 20 mounted via bearings 22 on to rotating axle 30. There is also an intermediate screen element 40 mounted on axle 30 via bearings 42. There is then a rotating component 50 which is fixably mounted to axle 30 and rotates with it.

Stator 20 has longitudinal winding elements 24 on protrusions around its inner circumference, these windings generating a magnetic field when powered.

Rotor 50 itself has windings 54 mounted at various positions along its outer circumference on protrusions extending from the rotor and when these are powered these too generate a magnetic field. The powering of the windings 54 on rotor 50 is controlled by control circuitry 56 while the powering of the stator windings 24 are controlled by control circuitry 26.

Between the stator and the rotor there is an intermediate screening element 40. This screening element acts to decouple the magnetic field generated by the stator from that generated by the rotor. The intermediate screening element 40 is itself mounted on bearings 42 on axle 30. By mounting it on the same axle as the stator is mounted and indeed as the rotor is mounted the tolerances of the device are easier to control as the axle is generally a highly machined article.

The intermediate screening element 40 has magnetically active areas 44 which interact with the magnetic fields generated by both the rotor and the stator providing a force which causes the intermediate screening element 40 to rotate. In many cases the screening element 40 will have magnetically active areas on both its inside and its outside surface.

In this regard, the magnetically active areas may consist of protrusions where the intermediate screening element is formed of a magnetic material such as silicon iron or it may consist of highly conductive loops arranged in a squirrel cage slanted arrangement in which an electric current is induced in response to a changing magnetic field such that a rotational force is exerted on the intermediate screening element 40.

By placing an intermediate screening element 40 between the stator 20 and the rotor 30 elements the rotor 30 and stator 20 are magnetically decoupled from each other and this allows the stator 20 and rotor 30 elements to be independently controlled and act like two independent motors. Thus, controlling the power supply to the rotor windings separately to the power control to the stator windings provides significantly increased control of the motor unit. In particular, as noted previously many of such motor arrangements run at very high efficiencies but only at particular power loadings, that is to generally where the coils are provided with sufficient power to provide a saturated magnetic field within the protrusion on which they are mounted. Allowing individual control of the stator 20 and the rotor 30 means that they can both be powered at or close to their most efficient loading independently of each other. This means that there are several rotational frequencies that can be generated where the motor is operating at a high efficiency.

Figure 1B:
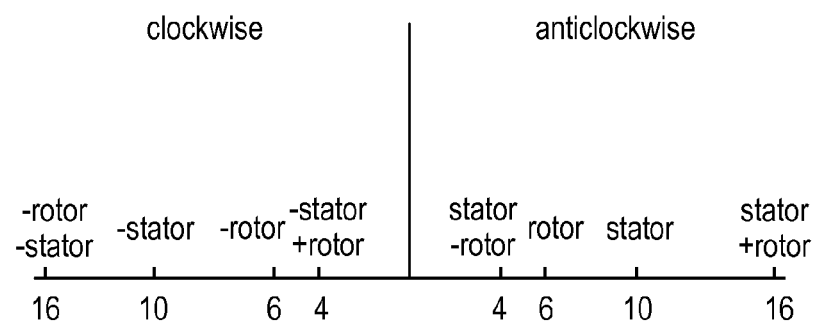
FIG. 1b shows a number of rotational speeds that can be produced by a motor with rotor and/or stator powered to a high power loading efficiency.

FIG. 1b shows schematically how such a motor may generate different rotational speeds while powering the respective windings to their most efficient power loading. In this example, the stator 20 will generate a hypothetical rotational speed of 10 units when powered to its most efficient power loading while the rotor will generate 6. Thus, by either powering them alone, or together or together but in opposite directions a number of different speeds can be obtained. Thus, stator alone gives 10 units either clockwise or anti-clockwise. Rotor alone gives 6 units, while stator plus rotor gives 16, and stator minus rotor gives 4. Thus, the potential rotational frequencies output by the motor at high efficiency are increased allowing the motor to operate without transmission systems in some cases.

Figure 2:
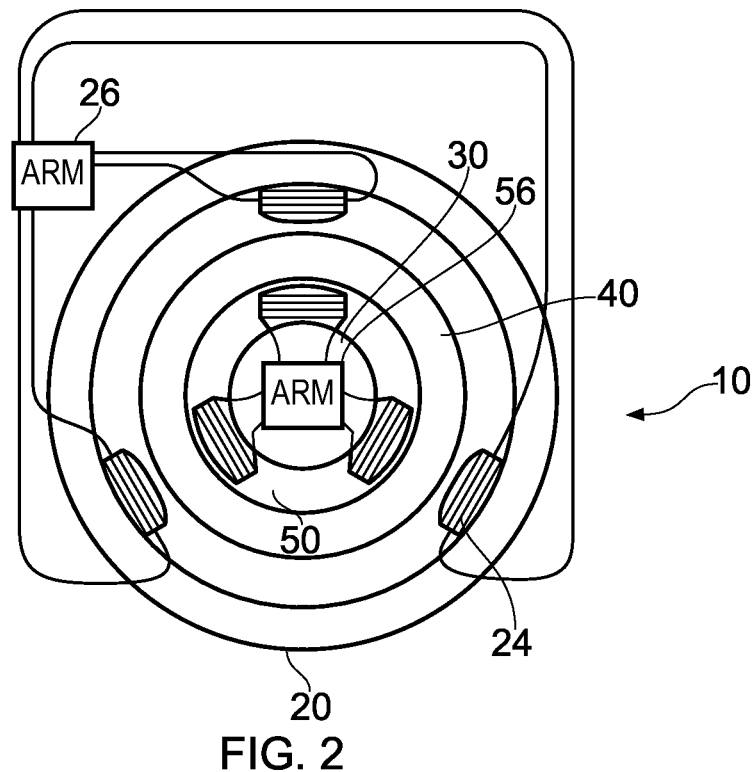
FIGS. 2 and 3 show cross sections through motors according to embodiments of the present invention.

FIG. 2 shows a motor 10 according to an embodiment of the present invention in cross section. In this embodiment, there are three coils on the stator 20 and correspondingly three coils on the rotor 30. There is an intermediate rotating core 40 which acts as the intermediate screening component and will have some magnetically active components such as magnetic protrusions or high conductive loops on it which are not shown. The windings on the stator 20 and the rotor 30 are independently controlled by different processing cores 26 and 56 respectively.

Figure 3:
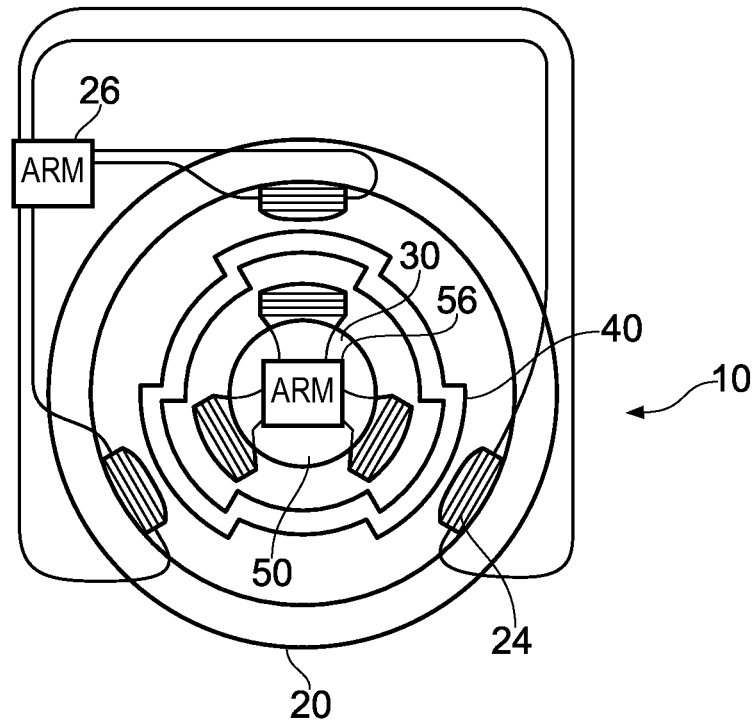

FIG. 3 shows an example of a motor 10 according to an embodiment of the present invention when a motor is a switched reluctance motor, the stator 20 and the rotor 30 have the same number of coils and the intermediate screening component 40 is formed of a magnetic material having protrusions. In this case, if the protrusions are arranged such that the indent on one side forms the protrusion on the other side this allows the screening element to be made of less material than would be the case were the protrusions not arranged in this way. This allows a less expensive and more compact motor to be built.

In order for such an arrangement to function efficiently it is advantageous if the number of coils on the rotor and the stator are equal. It should be clear, that in other embodiments there may be a different number of protrusions on the inner and outer surfaces of the intermediate screening component 40 and the number of coils on the stator and the rotor may also be different. In this regard it may be advantageous to have a different number of coils on the stator and rotor as the stator will naturally have a larger circumference and thus it can accommodate more coils than the rotor.

Figure 4:
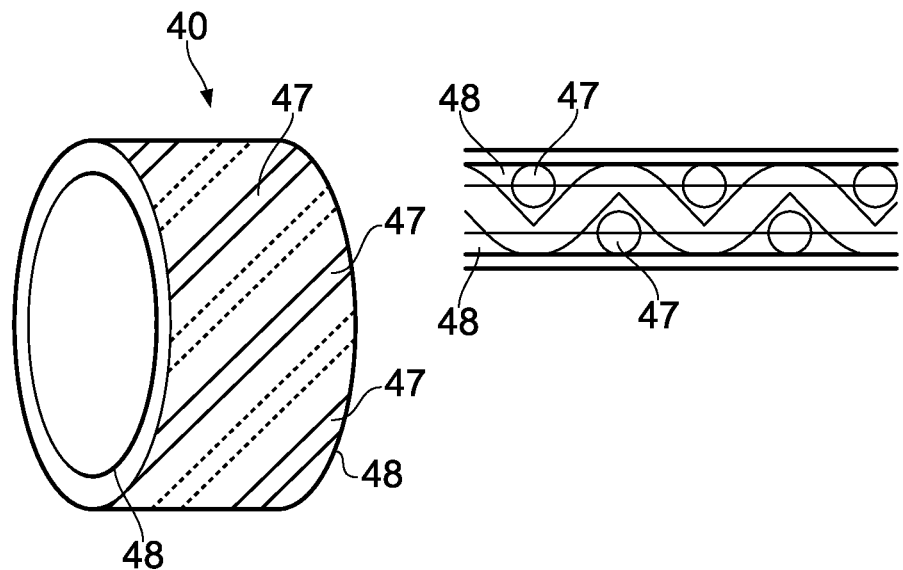
FIG. 4 shows an example of an intermediate screening component for an induction motor.

FIG. 4 shows an intermediate screening element 44 according to an embodiment of the present invention. In this embodiment, there are high conductive inserts 47 arranged at an angle to the longitudinal axis of the screening element in a squirrel caged arrangement. There is a conducting element 48 at either end which connects the inserts together allowing for loops to be formed.

In this embodiment, there are highly conductive inserts on both the inside and the outside surfaces of the screening element and they are arranged in this particular example at an offset to each other such that they can be inserted onto a thinner screening element than would be the case if they were arranged at a same circumstantial position.

This is shown schematically in cross section in FIG. 4 where the curved screening element is shown as a straight element for convenience of illustration. Inserts 47 on the outer surface are arranged offset to the inserts 47 that are on the inner surface. In order for these inserts to form loops through which current can flow there are two connecting areas that run along the inner circumference of this ring type screening element and the outer circumference respectively. One of the connection areas 48 connecting the inserts 47 that are on the inner surface together and the other connecting the inserts that are on the outer surface together.

Figure 5:
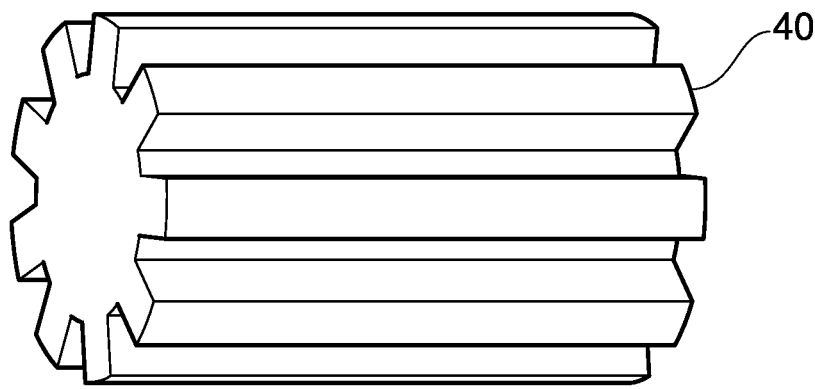
FIG. 5 shows an example of an intermediate screening component for a switched reluctance motor.
Figure 5:
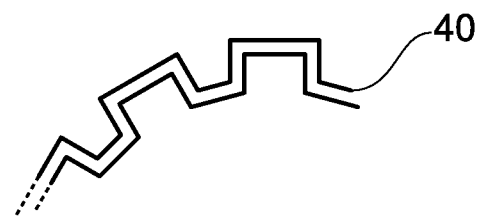

FIG. 5 shows an alternative screening element 40 that is used in switched reluctance motors. This screening element 40 is formed of a magnetic material such as silicon steel and contains protrusions on both the inner and the outer surfaces. When within a varying electric field the induced magnetic field in the protrusions generates a force on the screening element causing it to rotate. This force is caused in response to a changing magnetic field generated by the windings on one or more of the stator or the rotor.

In this embodiment, the protrusions on one side form the indents on the other side allowing the screen 40 to be made from a smaller amount of material and in a compact form allowing for a compact motor.

The screen 40 is shown in cross section in FIG. 5 such that it can clearly be seen that an indent on one side produces a protrusion on the other.

Figure 6:
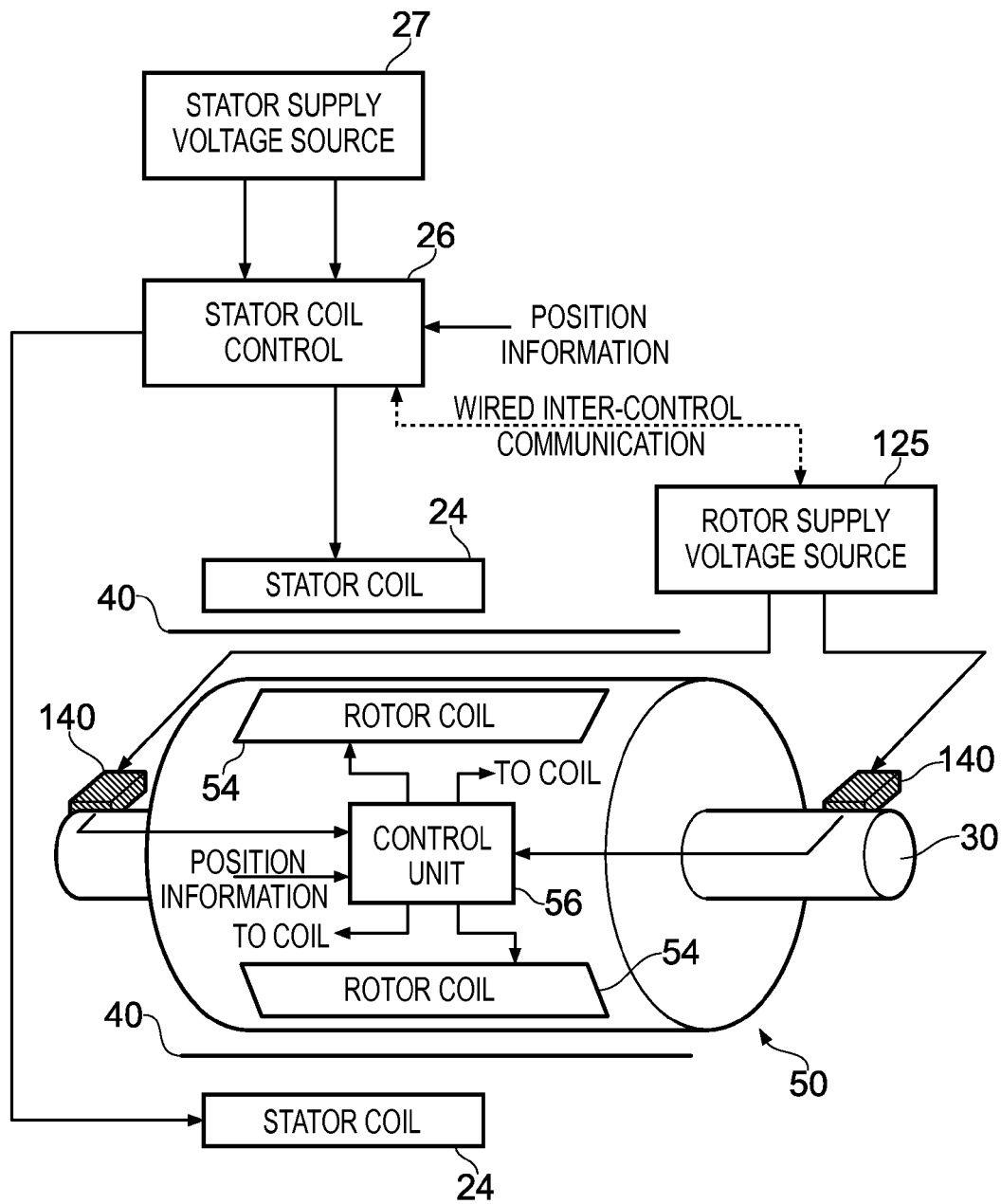
FIG. 6 shows a motor and control circuitry according to an embodiment of the present invention.

FIG. 6 shows motor 10 having rotor 30, screen 40 and stator not shown although stator coils 24 are shown. A power supply voltage 27 supplies power to the stator coil via stator control circuitry 26. The stator coil control circuitry 26 also receives an input from the rotor supply voltage source 125 such that it is aware of the voltage currently being supplied to the rotor and from position information indicating the relative position of the screen 40 and the rotor 30.

Motor 50 has a rotor control unit 56 which receives power via slip rings 140 from rotor supply voltage source 125. It also receives information about the position of the screen 40 relative to the rotor and in dependence upon this controls the powering to the rotor coils. In this way, the powering of the rotor and stator coils 54, 24 can be controlled depending on the relative position of the rotor 50 and the screen 40 to enable a desired output rotation of the axle 30 to be achieved.

Figure 7:
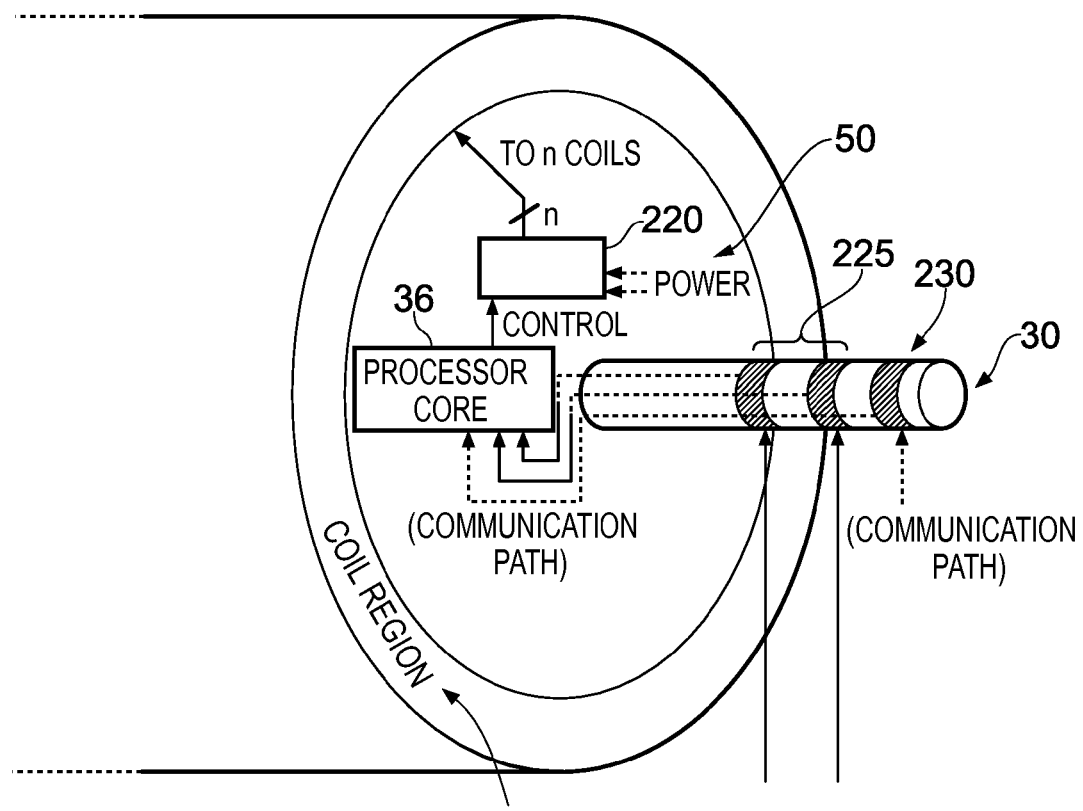
FIG. 7 shows a portion of the rotor and axle according to an embodiment of the present invention.

FIG. 7 shows the rotor 50 in more detail. There are several slips rings 225 and 230 for providing the power and the control signals to the rotor 50 via the rotating axle 30. There is also control circuitry 56 in the form of a processor core for controlling the voltage sent to the rotor coils (not shown) via circuitry 220 which receives a voltage from the power supply. In this case, circuitry 220 is in the form of switching circuitry which switches the power on and off to the respective coils in response to signals from the processor core 50 which reacts to information that it receives regarding the relative position of the rotor 50 to the intermediate screening component (not shown).

Figure 8:
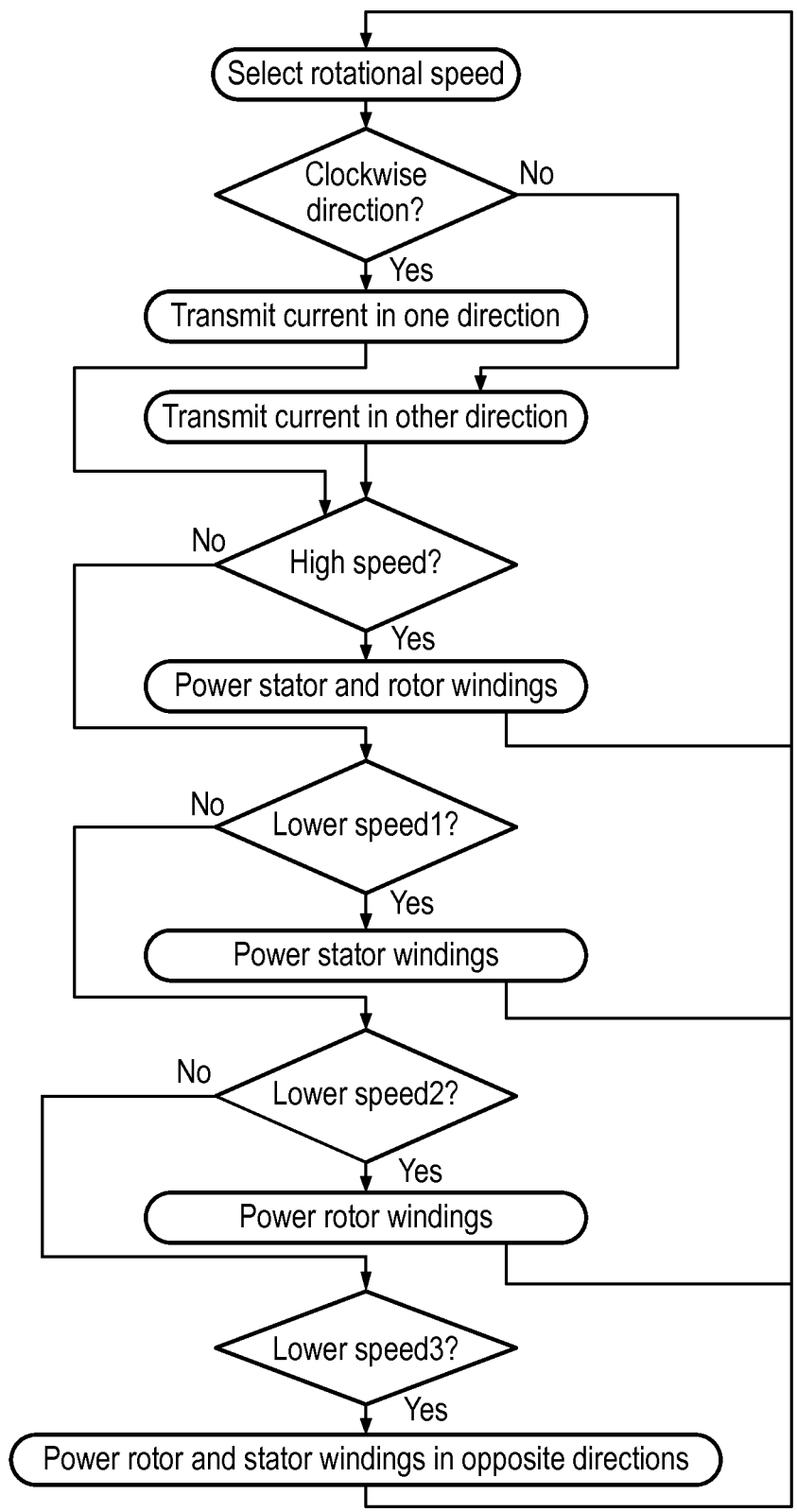
FIG. 8 shows a flow diagram illustrating steps in a method according to an embodiment of the present invention.

FIG. 8 shows a flow diagram illustrating steps in the method according to an embodiment of the present invention. Initially a desired rotational speed is selected and it is determined whether it is in the clockwise or anti clockwise direction. Depending on the required direction of the rotation, the polarity of the power to be supplied to the windings is determined It is then determined if the required rotational speed is a high speed. If it is then the stator and the rotor windings are both powered with current flowing in a direction that will generate the required direction of rotation. If it is a lower speed then one of the stator or the rotor windings may be powered on their own. In this regard, depending on the configuration, powering either the windings on the stator or the rotor may generate a different speed (see FIG. 1*b* for example). If the actual speed required is lower than the speed generated by either the rotor or stator powered alone then it may be appropriate to power one in one direction and the other in the opposite direction, such that they generate opposing rotational forces on the screening element, and the resulting rotation to of the axle is the difference between the two forces.

Had the anti-clockwise direction been selected initially then the same steps would have been performed except for with the current running through the coils in the opposite direction to generate a force in the opposite direction.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

I claim:

1. An electric motor apparatus comprising:
   a stator component and a rotor component rotationally mounted coaxially with and within said stator component;
   said stator component and said rotor component each comprising windings configured to generate an electromagnetic field from an electric current;
   said electric motor further comprising an intermediate screening component rotationally mounted between said stator component and said rotor component and configured to provide at least some magnetic screening between said rotor component and said stator component;
   said intermediate screening component comprising at least some magnetically active sections configured such that changing magnetic fields generated by changing electric currents in said windings on either said rotor component or said stator component generate a force on said magnetically active sections causing said intermediate screening component to rotate; and
   control circuitry for independently controlling power supplied to said windings on said rotor component and said stator component in dependence upon a desired output rotational speed.

2. An electric motor according to claim 1, wherein said stator component and said rotor component comprise a same number of windings.

3. An electric motor according to claim 1, wherein said intermediate screening component comprises a plurality of inserts on at least one of said inner and outer surfaces of a highly electrically conductive material, said plurality of inserts running at an offset angle to said longitudinal axis to form a squirrel cage, said plurality of inserts on a same surface being coupled at either end to form loops.

4. An electric motor according to claim 3, wherein said intermediate screening component comprises said plurality of inserts on both said inner and outer surfaces.

5. An electric motor according to claim 4, wherein said plurality of inserts on said inner surface are arranged at different circumferential positions to said plurality of inserts on said outer surface.

6. An electric motor according to claim 1, wherein said intermediate screening component comprises a plurality of protrusions extending from said intermediate screening component on at least one of said inner and outer surfaces.

7. An electric motor according to claim 6, wherein said intermediate screening to component comprises said plurality of protrusions on both said inner and outer surfaces.

8. An electric motor according to claim 7, wherein said inner and said outer surface comprise a same number of said plurality of protrusions, said plurality of protrusions on said inner surface being offset compared to said plurality of protrusions on said outer surface, such that a protrusion on said inner surface is not formed at a same circumferential position as a protrusion on said outer surface.

9. An electric motor according to claim 8, wherein said protrusions are formed by said inner and outer surfaces being undulating surfaces, said undulating surfaces undulating at a substantially same rate and same direction such that a thickness of said intermediate screening component is substantially constant around the circumference.

10. An electric motor according to claim 1, wherein said rotor component is mounted on an axle and said intermediate screening component is mounted on said axle.

11. An electric motor according to claim 1, wherein said control circuitry comprises a stator component control unit and a rotor component control unit, said rotor component control unit being mounted on said rotor component.

12. An electric motor according to claim 11, wherein
   said stator control unit is configured to control power supplied to said windings on said stator component to thereby generate a rotational force on said intermediate screening component; and
   said rotor control unit is configured to control power supplied to said windings on said rotor component to thereby generate a rotational force between said intermediate screening component and said rotor component, said rotational force exerted on said rotor component being dependent on a rotational speed of said intermediate screening component due to said rotational force generated by said stator component and said rotational force generated between said intermediate screening component and said rotor component by power supplied to said windings of said rotor component.

13. An electric motor according to claim 12, wherein said rotational forces generated by said stator control unit and said rotor control unit are combined via said intermediate screening component to generate a cumulative rotational force on said rotor component.

14. An electric motor according to claim 11, further comprising a rotational position sensor configured to generate rotational position information indicative of a relative orientation of said intermediate screening component and said rotor component and said intermediate screening component and said stator component, said rotor control unit mounted on said rotor component being coupled to a power supply supplied to said rotor component and configured to generate a rotor component power supply waveform from said power supply in dependence upon said rotational position information and a desired output frequency of rotation of said rotor component relative to said intermediate screening component and to apply said rotor component power supply waveform to said rotor component; and said stator control unit being coupled to a power supply supplied to said stator component and configured to generate a stator component power supply waveform from said power supply in dependence upon said rotational position information of said intermediate screening component and said stator component and a desired output speed of rotation and to apply said stator component power supply waveform to said stator component.

15. A method of operating an electric motor apparatus, said electric motor apparatus comprising: a stator component and a rotor component rotationally mounted coaxially with and within said stator component; said stator component and said rotor component each comprising windings for generating an electromagnetic field; said electric motor further comprising an intermediate screening component rotationally mounted between said stator component and said rotor component and configured to provide at least some magnetic screening between said rotor component and said stator component; said intermediate screening component comprising at least some magnetically active sections configured such that changing magnetic fields generated by changing electric currents in said windings on either said rotor component or said stator component generate a force on said magnetically active sections causing said intermediate screening component to rotate; said method comprising controlling an output rotational speed of said motor by providing power to either said rotor or said stator or said rotor and said stator, control circuitry for independently controlling power supplied to said windings on said rotor component and said stator component in dependence upon a desired output rotational speed.

16. An electric motor apparatus comprising:

a stator component and a rotor component rotationally mounted coaxially with and within said stator component;

said stator component and said rotor component each comprising windings means for generating an electromagnetic field;

said electric motor further comprising an intermediate screening means for providing at least some magnetic screening between said rotor component and said stator component, said intermediate screening means being rotationally mounted between said stator component and said rotor component;

said intermediate screening means comprising at least some magnetically active means for responding to changing magnetic fields generated by changing electric currents in said windings on either said rotor component or said stator component by generating a force such that said intermediate screening component is caused to rotate; and control means for independently controlling power supplied to said winding means on said rotor component and said stator component in dependence upon a desired output rotational speed.

\* \* \* \* \*